United States Patent
Kristiansen

(10) Patent No.: US 10,205,680 B2
(45) Date of Patent: Feb. 12, 2019

(54) NETWORK SWITCH AND METHOD OF OPERATING A COMMUNICATION NETWORK

(71) Applicant: SIEMENS AKTIENGESELLSCHAFT, Munich (DE)

(72) Inventor: Karstein Kristiansen, Trondheim (NO)

(73) Assignee: Siemens Aktiengesellschaft, München (DE)

( * ) Notice: Subject to any disclaimer, the term of this patent is extended or adjusted under 35 U.S.C. 154(b) by 437 days.

(21) Appl. No.: 14/419,209

(22) PCT Filed: Jun. 20, 2013

(86) PCT No.: PCT/EP2013/062840
§ 371 (c)(1),
(2) Date: Feb. 2, 2015

(87) PCT Pub. No.: WO2014/019764
PCT Pub. Date: Feb. 6, 2014

(65) Prior Publication Data
US 2015/0215238 A1    Jul. 30, 2015

(30) Foreign Application Priority Data

Aug. 1, 2012 (EP) .................................. 12178866

(51) Int. Cl.
*H04L 12/12* (2006.01)
*H04L 12/935* (2013.01)
(Continued)

(52) U.S. Cl.
CPC .............. *H04L 49/30* (2013.01); *H04L 12/12* (2013.01); *H04L 41/0672* (2013.01);
(Continued)

(58) Field of Classification Search
CPC ....................................................... H04L 49/30
See application file for complete search history.

(56) References Cited

U.S. PATENT DOCUMENTS 5,258,655 A * 11/1993 May ................... H03K 17/6242
307/125
5,297,015 A * 3/1994 Miyazaki .................. H02J 3/00
307/151
(Continued)

FOREIGN PATENT DOCUMENTS

DE       102008035544 A1    2/2010
WO       WO2006127915 A2    11/2006

OTHER PUBLICATIONS

European Office Action for related European Application No. 12178866.5-2416, dated Oct. 9, 2012.
(Continued)

*Primary Examiner* — Hassan Kizou
*Assistant Examiner* — Abdullahi Ahmed
(74) *Attorney, Agent, or Firm* — Lempia Summerfield Katz LLC

(57) ABSTRACT

A network switch includes: a plurality of communication ports, each communication port of the plurality of communication ports having a first electrical output terminal and a second electrical output terminal configured for providing an electrical output signal between the first electrical output terminal and the second electrical output terminal. The network switch is configured to electrically switch off the electrical output signal of at least one communication port of the plurality of communication ports.

18 Claims, 1 Drawing Sheet

(51) Int. Cl.
*H04L 12/24* (2006.01)
*H04L 12/931* (2013.01)

(52) U.S. Cl.
CPC .............. *H04L 41/08* (2013.01); *H04L 49/40* (2013.01); *Y02D 50/40* (2018.01); *Y02D 50/42* (2018.01)

(56) References Cited

U.S. PATENT DOCUMENTS

| | | | |
|---|---|---|---|
| 5,444,856 A * | 8/1995 | Bowers | H04L 12/44 709/221 |
| 8,018,349 B1 * | 9/2011 | Getker | H04L 12/413 340/660 |
| 2002/0180592 A1 * | 12/2002 | Gromov | H04B 3/548 370/200 |
| 2006/0152379 A1 * | 7/2006 | Lewis | H02H 3/04 340/679 |
| 2006/0290208 A1 * | 12/2006 | Chang | H04L 12/10 307/116 |
| 2008/0175159 A1 | 7/2008 | Caveney et al. | |
| 2010/0246408 A1 * | 9/2010 | Kerber | H04L 12/437 370/242 |
| 2011/0145613 A1 | 6/2011 | Borchers | |

OTHER PUBLICATIONS

PCT International Search Report and Written Opinion of the International Searching Authority dated Aug. 19, 2013 for corresponding PCT/EP2013/062840.

* cited by examiner

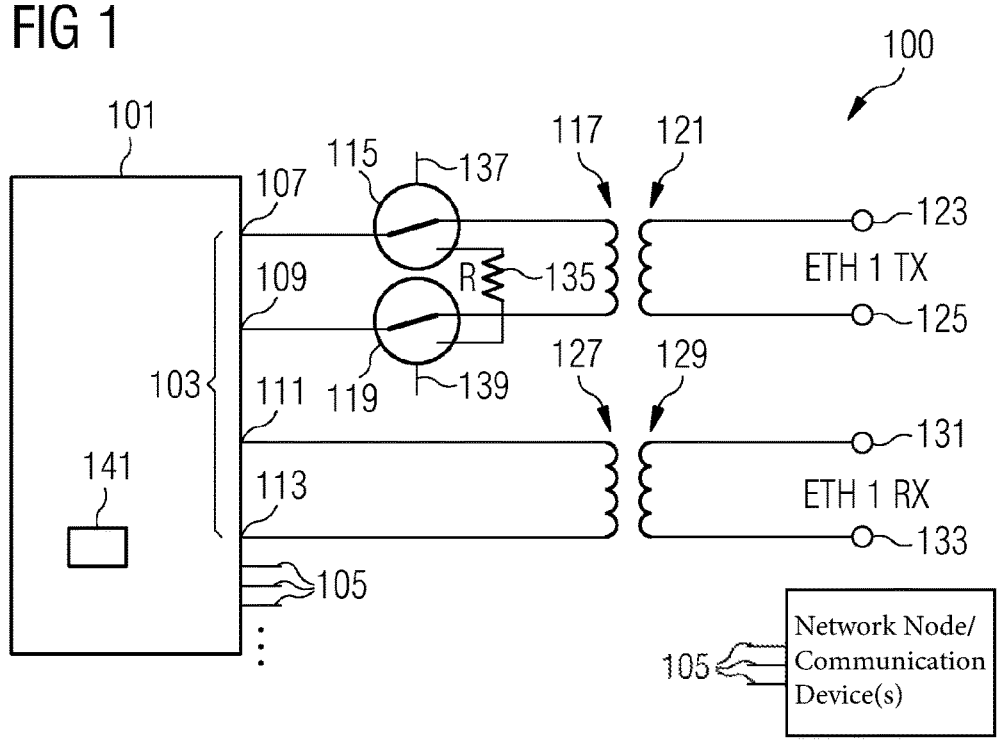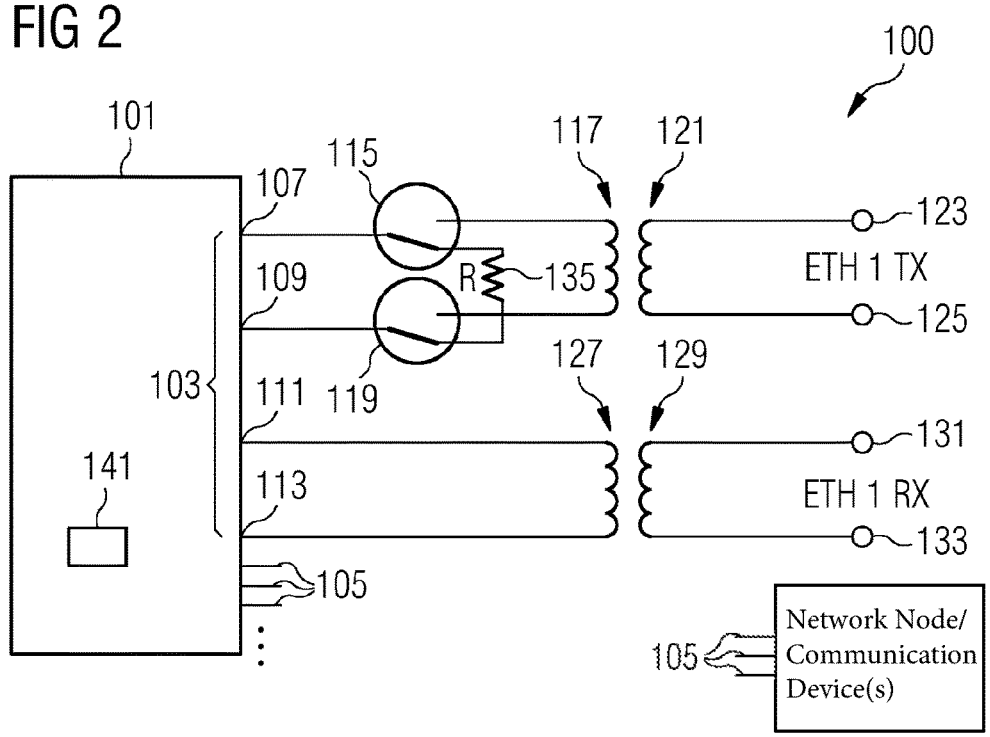

NETWORK SWITCH AND METHOD OF OPERATING A COMMUNICATION NETWORK

RELATED APPLICATIONS

This application is the National Stage of International Application No. PCT/EP2013/062840, filed Jun. 20, 2013, which claims the benefit of European Patent Application No. EP 12178866.5, filed Aug. 1, 2012. The entire contents of both documents are hereby incorporated herein by reference.

TECHNICAL FIELD

The present teachings relate generally to a network switch and a method of operating a communication network. At least one port of the network switch may be disabled to allow disconnection of a communication device coupled to the communication switch in a subsea application.

BACKGROUND

A network switch is a computer networking device that connects network segments or network devices with each other. The network switch may also be a multi-port network bridge that processes and routes data at the data link layer (e.g., layer 2) of the open systems interconnection (OSI) model. The switch is a telecommunication device that receives a message from any device connected to the switch, and then transmits the message only to that device for which the message was intended. Thus, the network switch is a more intelligent device than a simple hub. A hub a message and then transmits the message to all of the other devices of the network.

An Ethernet switch may operate at the data link layer of the OSI model to create a separate collision domain for each switch port. For example, for four computers (e.g., A, B, C, and D) on a switch having four switch ports, computers A and B may transfer data back and forth, while computers C and D simultaneous transfer data back and forth too. The two conversations will not interfere with one another.

For subsea applications (e.g., oil/gas explorations), a communication network may be set up for controlling different devices (e.g., pumps, measuring devices, etc.) at the sea ground. A Profinet/Ethernet switch may be used in subsea installations.

However, administration or modification to the communication network at the sea ground (e.g., a depth of between 1000 m and 4000 m below sea level) may be difficult.

SUMMARY AND DESCRIPTION

The scope of the present invention is defined solely by the appended claims, and is not affected to any degree by the statements within this summary.

A network switch and a method of operating a communication network may be provided, wherein administration of the communication network and/or modification of the communication network is facilitated. Further, the network switch and the method of operating in a communication network may be robust and operable under harsh conditions (e.g., in sea water).

The present embodiments may obviate one or more of the drawbacks or limitations in the related art. For example, in some embodiments, a network switch is provided that includes a plurality of communication ports. Each port of the plurality of communication ports has a first electrical output terminal and a second electrical output terminal configured for providing an electrical output signal between the first electrical output terminal and the second electrical output terminal. The network switch is configured to electrically switch off the electrical output signal of at least one communication port of the plurality of communication ports.

By way of example, the network switch may have one to one hundred ports (e.g., in some embodiments, between ten and fifty ports and, in other embodiments, between twenty and thirty ports). Each port may be formed or configured as a socket or a plug (e.g., RJ45 compliable in the case of an Ethernet network switch). In the socket, a respective plug connected to a communication cable may be inserted. The communication cable may be connected to a respective communication device that may exchange data with other communication devices connected to the same network switch or to other network switches via the network switch.

The electrical output signal may be an electrical voltage between the first electrical output terminal and the second electrical output terminal. The communication protocol for input and/or output may be according to TCP/IP. Thus, packages of data may be sent as an input signal or output signal. The output signal may be represented by a pattern of voltage peaks or voltage levels.

The protocol may be according to the Ethernet protocol, the RS485 protocol, the RS422 protocol, or the RS232 protocol. All of the different protocols may have different voltage levels between the first electrical output terminal and the second electrical output terminal to represent logical true or false values. For example, the voltage between the first electrical output terminal and the second electrical output terminal may be between −2.5 Volt and +2.5 Volt for the Ethernet protocol to represent logical true and false, respectively. In some embodiments, the output signal may be a differential signal or may not be a non-differential signal. In a differential output signal, the output signal is represented by a difference of voltages between the first electrical output terminal and the second electrical output terminal.

By electrically switching off the electrical output signal of at least one communication port of the plurality of communication ports, the network switch may be used for a subsea application, and also when the communication network is to be modified. To modify the communication network, a previous communication device may, for example, be replaced by a new communication device. The respective port to which the previous communication device is connected may be electrically switched off, such that no voltage is present at the first electrical output terminal and the second electrical output terminal. When the respective plug of the previous communication device is unplugged from the port (e.g., socket), the electrical connection pins are exposed to seawater containing electrolytes (e.g., salt). In a conventional system that has a voltage between the respective output pins, corrosion and damage to the pins may occur from an electrical current via the electrolyte solution between different pins or terminals. In accordance with the present teachings, no voltage is present between the first electrical output terminal and the second electrical output terminal, and electrical current does not flow between the first electrical output terminal and the second electrical output terminal. Thus, damage to the electrical pins or output terminal is avoided.

In some embodiments, an old unit (e.g., a previous communication device) may be replaced one by one over several years until a complete upgrade of all units is achieved. While replacing one of the old units, the other existing units may continue operation and, therefore, continue communication via the network switch with other units or communication devices. In accordance with the present teachings, the network switch may remain in operation, such that communication of data via other ports of the network switch (e.g., the ports at which the respective output signals are not switched off) are still operating and, therefore, providing communication capabilities.

In a conventional system, the entire network switch is shut down to replace just one communication device connected to only one of the ports of the network switch. As a result, communication between other communication devices that are also connected to the network switch does not occur. Moreover, a long shutdown is observed, and a cumbersome and time-consuming start-up procedure is implemented before the subsea system may resume operation.

In some embodiments, a communication network may be operated more efficiently—and the communication of data between large numbers of communication devices may continue—even if a single communication device connected to the network switch is to be replaced.

A network switch in accordance with the present teachings may operate at one or more layers of the OSI model, including the data link and network. The network switch may also be, or may include, a multilayer switch, such that the network switch operates simultaneously at one or more layers of the OSI model.

The network switch may be configured differently depending on the type of network that the network switch is used for or the type of communication devices that are interconnected. When a communication network is setup, the network switch may learn the topology of the network including the knowledge of which network device is connected to which port. In some embodiments, the MAC address of each connected communication device may be considered. When the network switch receives a message, the network switch may first verify each message or each received frame before forwarding the message. In some embodiments, the network switch may read the message at least or only up to the hardware address of the frame (e.g., MAC address) before starting to forward the message. The network switch may perform a cut through.

The network switch may also be an adaptive network switch that automatically selects between different modes of operation, such as "store and forward," "cut through," and "fragment free."

The network switch may operate on layer 2, layer 3, layer 4, or any other layer of the OSI model.

In some embodiments, a network switch in accordance with the present teachings may also be called a managed network switch, and may allow modification the manner of operation of the network switch. For example, the network switch may be managed using a command-line interface (CLI) accessed via a serial console, a tended or secure shell, an embedded simple network management protocol (SNMP) agent allowing management from a remote console or management station, or a web interface for management from a web browser.

In some embodiments, the first electrical output terminal of the at least one communication port has the same electrical potential as the second electrical output terminal of the at least one communication port when the electrical output signal of the at least one communication port is switched off.

In some embodiments, when the electrical output signal has been switched off, a voltage between the first electrical output terminal and the second electrical output terminal may be zero Volts. Thus, no damage (e.g., due to current flow between the terminals across a conductive medium, such as sea water) may occur at electrical terminals that may be exposed to sea water (e.g., when a respective plug is removed from the port that has been switched off).

In some embodiments, the electrical potential of the first electrical output terminal and the second electrical output terminal is the ground potential or earth potential. Thus, the first electrical output terminal and the second electrical output terminal have the same electrical potential as the earth. No electric current may flow between either one of the first or the second electrical output terminal and the earth. As a result, further damage to the output terminals and damage to the network switch itself may be avoided.

In some embodiments, the network switch further includes a first semiconductor switch (e.g., a transistor) configured to switch off the electrical output signal. In some embodiments, the configuration of the network switch may be simplified, and commercially available components may be used, to implement the network switch and effect switching off the electrical output signal.

In some embodiments, the network switch further includes a primary coil configured to be connected to a first internal output terminal and a second internal output terminal, and a secondary coil configured to be connected to the first output terminal and the second output terminal. The primary coil is connected to the first internal output terminal and the second internal output terminal when the electrical output signal is activated (e.g., enabled).

The primary coil and the secondary coil may be inductively coupled to each other, such that a voltage signal or a current flowing in the primary coil may induce a voltage in the secondary coil. Thus, a signal applied to the primary coil may be transferred to the first output terminal and the second output terminal without having a Galvanic connection between the first internal output terminal and the first output terminal, or between the second internal output terminal and the second output terminal. A galvanic separation between the output terminal and the internal output terminals may be achieved to provide safe operation of the network switch.

The primary coil and the secondary coil may form a transformer that may allow adjustment to a voltage output level at the first output terminal and the second output term as desired. As a result, the output signal may be adapted flexibly.

In some embodiments, when the electrical output signal is switched off, the first semiconductor switch electrically connects (e.g., via a resistor) the first internal output terminal to the second internal output terminal, such that no electrical current flows in the primary coil.

The resistor may also be referred to as a terminating resistor to terminate the first internal output terminal and the second internal output terminal by short cutting them via the terminating resistor. As a result, damage to the network switch may be avoided, and safe and reliable operation may be provided.

In some embodiments, the network switch further includes a second semiconductor switch, and a resistor between the first semiconductor switch and the second semiconductor switch. The electrical output signal is switched off. The first semiconductor switch connects a first terminal of the resistor to the first internal output terminal, and may disconnect a first terminal of the primary coil from the first internal output terminal. The second semiconductor switch connects a second terminal of the resistor to the second internal output terminal, and may disconnect a second terminal of the primary coil from the second internal output terminal.

By way of example, the second semiconductor switch may be a transistor. The first semiconductor switch and the second semiconductor switch may be controlled via application of respective control signals at respective gates of the first and second semiconductor switches. In some embodiments, a conductance state of the semiconductor switches may be adjusted or changed.

The first semiconductor switch and the second semiconductor switch may provide a "single pole double throw" function that allows the first internal output terminal to be connected to the first terminal of the resistor or to a first terminal of the primary coil, and that allows the second internal output terminal to be connected to the second terminal of the resistor or to a second terminal of the primary coil.

Alternatively, the first semiconductor switch and the second semiconductor switch may connect or disconnect the first terminal/second terminal of the resistor to the first internal output signal/second internal output signal. As a result, the first terminal of the primary coil may remain connected to the first internal output terminal, and the second terminal of the primary coil may stay connected to the second internal output terminal.

Thus, a simple construction that may provide reliable operation may be achieved.

In some embodiments the network switch further includes a controller configured to control switching off the electrical output signal (e.g., based on a received control signal).

The controller may also be referred to as a processing unit. The processing unit may be accessible by a user interface (e.g., a command line or graphical user interface). In some embodiments, the network switch may be controlled from a location above sea level. The received control signal may indicate which of the ports of the network switch are to be switched off. Thus, the network switch may be remote controlled without having a technician configure the network switch at the sea ground.

In some embodiments the controller is configured to control a conductance state of the first semiconductor switch or a conductance state of both the first semiconductor switch and the second semiconductor switch.

In some embodiments, the processor may send respective control signals to respective gates of the first semiconductor switch and the second semiconductor switch to adjust the conductance states of the semiconductor switches.

Thus, the configuration of the network switch and the control may be simplified.

In some embodiments, each port has a first electrical input terminal and a second electrical input terminal configured for receiving an electrical input signal between the first electrical input terminal and the second electrical input terminal. In some embodiments, the port is configured to selectively remove an electrical voltage between the first electrical input terminal and the second electrical input terminal.

In some embodiments, the pair of the first electrical output terminal and the second electrical output terminal may be referred to as "TX" for transmission, and the pair of the first electrical input terminal and the second electrical input terminal may be referred to as "RX" for receiving. In some embodiments, the TX-pair of terminals and the RX-pair of terminals may be configured as a socket or a plug. Thus, the four terminals may be housed in a housing of a socket (e.g., an Ethernet socket) to establish or allow a RJ45 connection.

Each port of the network switch is configured to receive an input terminal to the respective communication device coupled to the respective port. Thus, a complete communication (e.g., transmitting and receiving messages to the communication device connected to the port) may be facilitated.

At the first electrical input terminal and the second electrical input terminal, no electrical voltage is applied during normal operation. As a result, switching off the first electrical input terminal and the second electrical input terminal may be avoided when unplugging the plug from the port (e.g., in case the connected communication device is to be replaced).

In some embodiments, the method switch is configured as an Ethernet switch or a Profinet. In some embodiments, the ports are configured as sockets (e.g., RJ45 sockets).

PROFINET is the open industrial Ethernet standard of PROFIBUS & PROFINET International (PI) for automation. PROFINET uses TCP/IP and IT standards, and is, in effect, real-time Ethernet. The PROFINET concept features a modular structure so that users may select the cascading functions themselves. The functions may differ based on the type of data exchange to fulfill high speed requirements.

In conjunction with PROFINET, the two perspectives PROFINET CBA and PROFINET IO exist. PROFINET CBA may be used for component-based communication via TCP/IP. PROFINET IO may be used for real-time communication in modular systems engineering. Both communication options may be used in parallel. PROFINET IO was developed for real time (RT) and isochronous real time (IRT) communication with the decentral periphery. The designations RT and IRT describe the real-time properties for communication within PROFINET IO.

Profinet is a new and emerging standard that, in the future, may be included instead of, or in conjunction with. existing profibus-equipped systems. The bandwidth is broader, and the communication protocol is more robust. The link layer and the physical layer of profinet-based equipment are based on standard Ethernet equipment.

Standard communication connection cables and plugs may be used to connect respective communication devices to the network switch.

In some embodiments, the network switch is configured for a subsea application. In some embodiments, an appropriate sealing of the network switch may be provided, to avoid sea water penetrating through a sealed housing of the network switch into an interior of the network switch, thereby damaging the network switch. Furthermore, the socket or plug of each port may have features for sealing when a respective plug or socket is connected thereto, thus avoiding sea water penetrating into the network switch or to the terminals of each port.

In some embodiments, a subsea network system is provided that includes a network switch of a type described above. The network switch may be configured as a subsea network switch. The subsea network system further includes a subsea network node that may, for example, be a subsea device having a network card (e.g., for Ethernet or Profinet communication). The subsea network node is connected to one of the at least one switchable communication ports of the subsea network switch. The subsea network switch is configured to be controllable to switch off the electrical output signal of the communication port to which the subsea network node is connected, thereby facilitating disconnection of the subsea network node even if both the subsea network switch and the subsea network node are installed subsea.

It is to be understand that the features described in connection with a network switch in accordance with the present teachings may likewise be applied—individually or in any combination—to a method of operating a communication network in accordance with the present teachings, and vice versa.

In some embodiments, a method of operating a communication network (e.g., in some embodiments, in sea water between 1000 m and 4000 m below sea level) is provided. The method includes: using a network switch having a plurality of communication ports, each communication port of the plurality of communication ports having a first electrical output terminal and a second electrical output terminal configured for providing an electrical output signal between the first electrical output terminal and the second electrical output terminal; and electrically switching off, by the network switch, the electrical output signal of at least one communication port of the plurality of communication ports.

The method facilitates continued operation of the network switch with regard to other ports that are not switched off, such that communication between other communication devices connected to the other ports may continue. In some embodiments, the network switch may not be completely switched off, such that communications to or from other ports or all ports of the network switch are disabled. Communication between other communication devices that are connected to other ports that are not disabled may continue without being impaired by switching off the respective port at which a communication device to be replaced is connected.

In some embodiments, a method of replacing a first communication device connected to a port of a network switch with a second communication device is provided. The method includes: performing a method of operating a communication network in accordance with the present teachings, as described above; disconnecting the first communication device from the port at which the output signal has been switched off; exposing the port to sea water; connecting the second communication device to the port; and activating (e.g., enabling) the output signal at the port.

BRIEF DESCRIPTION OF THE DRAWINGS

FIG. 1 shows a schematic illustration of an example of a network switch in accordance with the present teachings in a normal operation mode.

FIG. 2 shows a schematic illustration of the exemplary network switch of FIG. 1 in a muted operation mode, wherein one port is switched off.

DETAILED DESCRIPTION

FIG. 1 shows a schematic illustration of an exemplary network switch 100 in accordance with the present teachings in a normal operation mode. The network switch 100 includes a housing 101 containing a controller 141. A number of ports 103 and 105 are provided at the housing 101.

The ports 105 are only shown schematically. The port 103 is illustrated in greater detail, albeit schematically. The ports 105 may be configured in the same or a similar manner to the port 103. In some embodiments, the port 103 includes a first internal output terminal 107, a second internal output terminal 109, a first internal input terminal 111, and a second internal input terminal 113. When the port 103 is in a normal operation mode (e.g., enabled), the first internal output terminal 107 is connected to a terminal of a primary coil 117 via a first semiconductor switch 115, and the second internal output terminal 109 is connected to another of the primary coil 117 via a second semiconductor switch 119.

The primary coil 117 is inductively coupled to a secondary coil 121. The secondary coil 121 is connected to a first electrical output terminal 123 and a second electrical output terminal 125. The pair of the first electrical output terminal 123 and the second electrical output terminal 125 is labeled in FIG. 1 as ETH 1 TX indicating the transmission output terminals of Ethernet port 1 of the network switch 100. The port 103 further includes an additional primary coil 127. The internal input terminal 101 and the internal input terminal 113 are connected to the additional primary coil 127. The additional primary coil 127 is inductively coupled to an additional secondary coil 129. The additional secondary coil 129 is connected to a first electrical input terminal 131 and a second electrical input terminal 133. The pair of the first electrical input terminal 131 and the second electrical input terminal 133 is labeled in FIG. 1 as ETH 1 RX indicating the input terminals of the Ethernet port 1 of the network switch 100.

The other ports 105 may be configured similarly to the port 103.

As shown schematically in FIG. 2, the network switch further includes a resistor 135 that may be selectively connected to the first internal output terminal 107 and the second internal output terminal 109 when the port 103 is to be switched off (e.g., the output signal is switched off). The first semiconductor switch 115 receives a control signal from the controller 141 at a gate terminal 137, and the second semiconductor switch 119 receives a control signal from the controller 141 at a gate terminal 139, thereby causing the first semiconductor switch 115 and the second semiconductor switch 119 to connect the resistor 135 to the first internal output terminal 107 and the second internal output terminal 109, as shown in FIG. 2.

When the port 103 is switched off, an electrical output signal that may be present at the first internal output terminal 107 and the second internal output terminal 109 may not be transferred to the first electrical output terminal 123 and the second electrical output terminal 125. Thus, a voltage between the first electrical output terminal 123 and the second electrical output terminal 125 is zero, as shown in FIG. 2, when an output signal between the first electrical output terminal and the second electrical output terminal is switched off by the operation of the first semiconductor switch 115 and the second semiconductor switch 119. The first semiconductor switch 115 and the second semiconductor switch 119 thereby connect the terminating resistor 135 to the first internal output terminal 105 and the second internal output terminal 109.

The network switch 100 may be used to change/replace one communication device that is connected, for example, to the port 103 or to any other port 105 of the network switch with a new communication device without disabling or shutting down the whole network switch 100. Thus, other communication devices remain connected to the network switch and continue exchanging data with other network devices or communication devices that are also connected to the network switch 100. As a result, flexibility and reliability of the whole subsea system may be increased.

In accordance with the present teachings, for subsea applications, voltage on the pins of the network switch that are exposed to seawater (e.g., that would destroy the connectors) may be avoided. Thus, the network switch provides an "electrically muted output"—not only a "muted output."

As used herein, the term "comprising" does not exclude additional elements or acts, and the indefinite articles "a"

and "an" do not exclude a plurality. In addition, elements described in association with different embodiments may be combined to provide further embodiments.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The invention claimed is:

1. A network switch comprising:
a plurality of communication ports, each communication port of the plurality of communication ports comprising a first electrical output terminal and a second electrical output terminal configured for providing an electrical output signal between the first electrical output terminal and the second electrical output terminal;
a primary coil configured to connect to a first internal output terminal and a second internal output terminal; and
a secondary coil configured to connect to the first electrical output terminal and the second electrical output terminal of a communication port of the plurality of communication ports;
wherein, when the electrical output signal is activated, the primary coil is connected to the first internal output terminal and the second internal output terminal,
wherein the network switch is configured to electrically switch off the electrical output signal of at least one communication port of the plurality of communication ports, and
wherein, when the electrical output signal of the at least one communication port is switched off, the first electrical output terminal of the at least one communication port has an electrical potential that is identical to an electrical potential of the second electrical output terminal of the at least one communication port.

2. The network switch of claim 1, wherein the electrical potential is a ground potential.

3. The network switch of claim 1, further comprising:
a first semiconductor switch configured to switch off the electrical output signal.

4. The network switch of claim 1, wherein, when the electrical output signal is switched off, the first semiconductor switch electrically connects the first internal output terminal and the second internal output terminal via a resistor, such that no electrical current flows in the primary coil.

5. The network switch of claim 1, further comprising:
a second semiconductor switch; and
a resistor between the first semiconductor switch and the second semiconductor switch;
wherein, when the electrical output signal is switched off:
the first semiconductor switch connects a first terminal of the resistor to the first internal output terminal and disconnects a first terminal of the primary coil from the first internal output terminal; and
the second semiconductor switch connects a second terminal of the resistor to the second internal output terminal and disconnects a second terminal of the primary coil from the second internal output terminal.

6. The network switch of claim 1, further comprising:
a controller configured to control switching off the electrical output signal based on a received control signal.

7. The network switch of claim 6, wherein the controller is configured to control a conductance state of a first semiconductor switch or a conductance state of the first semiconductor switch and a second semiconductor switch.

8. The network switch of claim 1, wherein each communication port of the plurality of communication ports further comprises a first electrical input terminal and a second electrical input terminal configured for receiving an electrical input signal between the first electrical input terminal and the second electrical input terminal; and
wherein each communication port of the plurality of communication ports is configured to selectively remove an electrical voltage between the first electrical input terminal and the second electrical input terminal.

9. The network switch of claim 1, wherein the network switch is configured as an Ethernet switch or a Profinet switch, and
wherein each communication port of the plurality of communication ports is configured as a socket.

10. The network switch of claim 1, wherein the network switch is configured for a subsea application.

11. The network switch of claim 2, further comprising:
a first semiconductor switch configured to switch off the electrical output signal.

12. The network switch of claim 4, further comprising:
a second semiconductor switch; and
a resistor between the first semiconductor switch and the second semiconductor switch;
wherein, when the electrical output signal is switched off:
the first semiconductor switch connects a first terminal of the resistor to the first internal output terminal and disconnects a first terminal of the primary coil from the first internal output terminal; and
the second semiconductor switch connects a second terminal of the resistor to the second internal output terminal and disconnects a second terminal of the primary coil from the second internal output terminal.

13. The network switch of claim 2, further comprising:
a controller configured to control switching off the electrical output signal based on a received control signal.

14. The network switch of claim 3, further comprising:
a controller configured to control switching off the electrical output signal based on a received control signal.

15. The network switch of claim 4, further comprising:
a controller configured to control switching off the electrical output signal based on a received control signal.

16. A subsea network system comprising:
a network switch configured as a subsea network switch; and
a subsea network node;
wherein the network switch comprises:
a plurality of communication ports, each communication port of the plurality of communication ports comprising a first electrical output terminal and a second electrical output terminal configured for providing an electrical output signal between the first electrical output terminal and the second electrical output terminal;
a primary coil configured to connect to a first internal output terminal and a second internal output terminal; and
a secondary coil configured to connect to the first electrical output terminal and the second electrical output terminal of a communication port of the plurality of communication ports;
wherein, when the electrical output signal is activated, the primary coil is connected to the first internal output terminal and the second internal output terminal,
wherein the network switch is configured to electrically switch off the electrical output signal of at least one communication port of the plurality of communication ports; and
wherein, when the electrical output signal of the at least one communication port is switched off, the first electrical output terminal of the at least one communication port has an electrical potential that is identical to an electrical potential of the second electrical output terminal of the at least one communication port;
wherein the subsea network node is connected to at least one switchable communication port of the subsea network switch, and
wherein the subsea network switch is controllable to switch off the electrical output signal of the connected communication port to facilitate disconnection of the subsea network node even when both the subsea network switch and the subsea network node are installed subsea.

17. A method of operating a communication network in sea water at a depth of between 1000 meters and 4000 meters below sea level, the method comprising:
providing a network switch that comprises a plurality of communication ports, each communication port of the plurality of communication ports comprising a first electrical output terminal and a second electrical output terminal configured for providing an electrical output signal between the first electrical output terminal and the second electrical output terminal, a primary coil configured to connect to a first internal output terminal and a second internal output terminal, and a secondary coil configured to connect to the first electrical output terminal and the second electrical output terminal of a communication port of the plurality of communication ports, wherein, when the electrical output signal is activated, the primary coil is connected to the first internal output terminal and the second internal output terminal; and
electrically switching off, by the network switch, the electrical output signal of at least one communication port of the plurality of communication ports;
wherein, when the electrical output signal of the at least one communication port is switched off, the first electrical output terminal of the at least one communication port has an electrical potential that is identical to an electrical potential of the second electrical output terminal of the at least one communication port.

18. A method of replacing a first communication device connected to a communication port of a network switch with a second communication device, the method comprising:
performing a method of operating a communication network in sea water at a depth of between 1000 meters and 4000 meters below sea level, the method of operating the communication network comprising:
providing a network switch that comprises a plurality of communication ports, each communication port of the plurality of communication ports comprising a first electrical output terminal and a second electrical output terminal configured for providing an electrical output signal between the first electrical output terminal and the second electrical output terminal, a primary coil configured to connect to a first internal output terminal and a second internal output terminal, and a secondary coil configured to connect to the first electrical output terminal and the second electrical output terminal of a communication port of the plurality of communication ports, wherein, when the electrical output signal is activated, the primary coil is connected to the first internal output terminal and the second internal output terminal; and
electrically switching off, by the network switch, the electrical output signal of at least one communication port of the plurality of communication ports, wherein, when the electrical output signal of the at least one communication port is switched off, the first electrical output terminal of the at least one communication port has an electrical potential that is identical to an electrical potential of the second electrical output terminal of the at least one communication port;
disconnecting the first communication device from the at least one communication port at which the electrical output signal has been switched off;
exposing the at least one communication port to sea water;
connecting the second communication device to the at least one communication port; and
activating the output signal at the at least one communication port.

* * * * *